United States Patent [19]

Siglow et al.

[11] 3,803,492

[45] Apr. 9, 1974

[54] METHOD AND APPARATUS FOR SYNCHRONIZING A RECEIVER FOR PHASE-DIFFERENCE MODULATED DATA SIGNALS

[75] Inventors: Joachim Siglow, Wolfratshausen; Karl Witte, Munich, both of Germany

[73] Assignee: Siemens Aktiengesellschaft, Berlin and Munich, Germany

[22] Filed: Aug. 16, 1972

[21] Appl. No.: 280,991

[30] Foreign Application Priority Data

Mar. 21, 1971 Germany .......................... 2213680

[52] U.S. Cl. .............................. 325/320, 178/66 R

[51] Int. Cl. ............................................ H04l 27/10

[58] Field of Search ......... 178/69.5 R, 67, 88, 66 R, 178/53.1 R; 179/15 BS; 325/320, 321, 30; 328/155; 331/10, 11

[56] References Cited

UNITED STATES PATENTS

| | | | |
|---|---|---|---|
| 2,843,669 | 7/1958 | Six et al. | 178/69.5 R |
| 2,934,604 | 4/1960 | Bizet | 178/69.5 R |
| 3,569,626 | 3/1971 | Michishita | 178/67 |

*Primary Examiner*—Benedict V. Safourek

[57] ABSTRACT

A method and apparatus for synchronizing a receiver for phase difference modulated data signals are described. The system under consideration herein transmits binary coded data by means of predetermined phase shifts at intervals corresponding to a modulation period and assigned to the various data step combinations. Correction signals for the clock rate and the reference carrier derived from the received carrier are supplied. In the receiver the clock rate for a scanning signal and the reference carrier are derived from a constant frequency generator. Phases of the received carrier wave modulated with phase shifts and phases of the reference carrier formed in the receiver are compared at time intervals corresponding to a carrier wave period. A correcting signal occurs only when the difference in the phase changes of the two signals being compared exceeds a given value. The correcting signal is compared with the receiver clock rate, and upon occurrence of the correcting signal, the clock interval before the timing pulse is shortened. Upon appearance of the correcting signal, after the timing pulse, the clock interval is lengthened. The clock initiates the comparison between the received carrier frequency pulse and the received carrier signal. When there is a difference between the phase of the carrier wave and the reference carrier wave, a phase correction is initiated in the reference carrier wave.

5 Claims, 7 Drawing Figures

PHASE COMPARATOR

METHOD AND APPARATUS FOR SYNCHRONIZING A RECEIVER FOR PHASE-DIFFERENCE MODULATED DATA SIGNALS

BACKGROUND OF THE INVENTION

This invention concerns a method and a circuit arrangement for synchronizing a receiver for phase-difference modulated data signals.

In data transmission systems to which this invention might be applied, binary coded data are transmitted by specified different phase shifts following each other at intervals corresponding to a modulation period. With reference to time, the phase shifts generally have a mean value such that there are approximately as many positive as there are negative phase shifts. The different phase shifts are assigned to the step combinations of the data to be transmitted. As is known, the correction signals for the receiver clock rate and the reference carrier wave are derived directly from the received carrier frequency of the data signal.

As is generally known, in the case of synchronously operating data transmission systems transmitting binary data signals, e.g., telegraph signals, the transmitting and receiving installations must be in synchronism with respect to frequency and phase, so that a correct evaluation, at the receiver of the transmitted binary data is possible. With the aid of scanning pulses, which scan midway between the individual steps of the communication signals, a regeneration of the data signals takes place relative to time. Frequency and phase position of the scanning signals may, in principle, be transferred with the data signal. However, this mode of operation will make great demands upon a given part of the signaling capacity of the transmission channel.

Consequently, in most synchronizing systems, the scanning pulses are derived, through a frequency divider, from a generator at the receiver, such a generator has a great frequency stability, e.g., through quartz stabilization. Since the frequency of the generator in the receiver always has certain, albeit in some cases very slight, deviations relative to the generator employed on the transmitting end, a synchronizing unit is needed at the receiver to correct these frequency differences. At the same time, at the beginning of the transmission, this unit can produce the correct phase position and maintain it during the transmission.

The correction of the phase position takes place by inserting or suppressing pulses before the frequency divider. The inserting and suppressing are controlled by logic circuit which determines the direction of the correcting operation from an interconnection of the scanning clock rate and the receiving signal, not regenerated as to time.

In the case of transmission systems using phase-difference modulation and coherent demodulation, however, not only clock pulses, but also in-phase reference carriers in the receiver are necessary for regenerating the information. To synchronize the clock rate and the reference carrier wave, further signals are transmitted. A conventional method includes a transmission system for phase-difference modulated data transmission which transmits the pulses independently of the modulated data signal carrier, as an additional amplitude modulation on the data signal carrier (West German Unexamined Patent Application 1,762,515). A commonly used technique is also to transmit the pulses and the reference carrier, in pilot channels outside the frequency band for the data.

The transmission of pilot signals for synchronization purposes significantly circuit complexity; in particular, extensive filter equipment is needed. This filter equipment lowers the signal power of the data signal, since a portion of the allowable transmitting power for the pilot channels must be shunted. Further amplitude modulation of the data carrier requires a sufficient dynamic range in the carrier. Due to the regeneration of the pulses, the pilot methods utilize a larger frequency band than would actually be needed for the data transmission. To produce the synchronism at the beginning of the transmission, periods lasting several seconds occur. These long synchronizing periods are particularly a disadvantage, if the direction of transmission or the transmission path changes frequency.

An object of this invention is the provision of a method which assures a very rapid and positive synchronization of the aforementioned pulses and reference carrier and which is easy to construct.

SUMMARY OF THE INVENTION

The aforementioned and other objects are achieved in a receiver in which the clock rate for the scanning signal and the reference carrier wave is derived from a constant frequency generator. The phases of the received carrier wave, modulated with the phase shifts, and of the reference carrier wave formed in the receiver are in each case compared at time intervals corresponding to a carrier wave period. A correction signal for the pulses arises only when the difference in the phase changes of the two waves being compared has exceeded a specified value since the last correcting pulse. The correcting signal is compared with the clock rate generated in the receiver. Upon the occurrence of the correcting signal, there arises a shortening in time of a clock interval before the timing pulse, and upon the occurrence of the correcting signal, there occurs after the timing pulse a prolongation of a clock interval. The clock initiates the comparison between the received carrier-frequency pulse and the reference carrier wave, and when there is a difference between the phase of the carrier wave and the reference carrier wave, a phase correction is triggered in the reference carrier wave.

A fundamental concept of the invention may be characterized in that the synchronization signals for the pulses and the reference carrier are derived directly from the information-carrying phase transition of the received carrier signal. The correction signals are formed directly from the clipped data signal carrier with discriminators which can be constructed using integrated circuit techniques. Considerably fewer circuits are required for the synchronizing unit than in the existing systems.

The clock synchronization is stable and independent of the state of the carrier phase, i.e., there is no dependence on reference carrier synchronization. The correcting signal for the reference carrier synchronization is derived directly from the timing pulse. The logic operation of timing pulse, the phase of the reference carrier wave and the data signal carrier wave produce the correcting signal for the subsequent adjustment of the reference carrier wave.

The method in accordance with the invention derives the signals for the clock and carrier synchronization from a signal which is dimensioned to fit an optimal interval at the scanning instant when there is a minimum need for a frequency band. In the circuit arrangements designed to carry out the method in accordance with the invention, the principle of the phase-corrected frequency divider is applied to good advantage. Transmitting and receiving filters are optimized to the largest interval in the middle of the step, when there is a minimum need for a frequency band, so as to make the best possible use of the available frequency band. Thus, the scanning instant lies in the middle of the modulation period and high transfer rates are possible.

BRIEF DESCRIPTION OF THE DRAWINGS

The invention will be best understood by reference to the description, given hereinbelow of a preferred form for its execution in conjunction with the drawings in which.

DETAILED DESCRIPTION OF THE DRAWINGS

Figure 1:
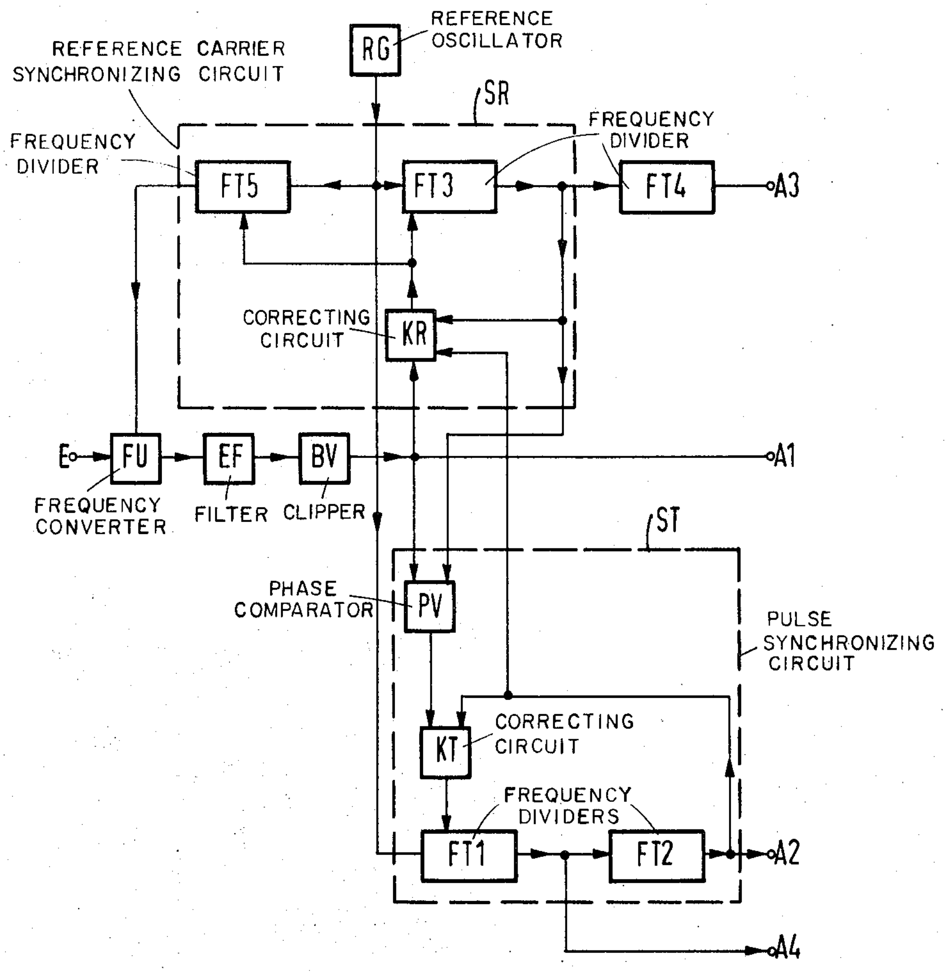
FIG. 1 is a block diagram for the synchronizing units of a data transmission system having an octavalent phase-difference modulation.

FIG. 1 shows the receiver of a data transmission system for octavalent phase-difference modulation in block diagram form. Only those units of the receiver are illustrated which play a part in the synchronization operation. The block diagram contains a synchronizing circuit ST for the pulses, and a synchronizing circuit SR for the reference carrier. These elements are of known construction. At the input E is disposed the data signal carrier which is modulated with the phase shifts. After passing through a conventional frequency converter FU wherein the data signal carrier is converted from, for example, 1.8 kHz to 27 kHz, after passing through a conventional receiving filter EF, which is proportioned to the largest interval in the middle of the step, and after passing through a clipper amplifier BV, the frequency-converted receiving signal reaches the demodulator via output A1.

The receiver contains a quartz-stabilized reference oscillator RG which delivers a constant frequency of 3.456 MHz. With the aid of frequency divider FT3, $n$ times the carrier frequency of the data signal is divided by the wave frequency, n referring to the number of possible phase shifts in the receiving signal. The oscillator RG transmits a square wave, so that the frequency division is simply accomplished by means of series connected bistable switching stages. In the present exemplary case, a reference carrier wave of 216 kHz ( 8 × 27 kHz) is required for an octavalent phase-difference modulation. This is done with a frequency divider containing four bistable switching stages, and by causing the oscillator frequency of 3.456 MHz to be divided by 16. A division factor of 8, made up of 3 bistable switching stages, is disposed after the frequency divider FT.

The reference carrier wave $\phi_r$ appears at output A3. Frequency divider FT4 is employed as a dynamic storage for the demodulation. In the phase-comparison circuit PV, the carrier receiving signal converted in the frequency is compared with $n$ times ($8 \times \phi_r$) the carrier wave, and the correcting signals are generated. The correcting signals are compared in the correcting circuit KT (described in detail hereinbelow in conjunction with FIG. 6) with the timing pulses at output A2, which are likewise generated by the reference oscillator RG using the two frequency dividers FT1 and FT2. The frequency divider FT1 divides the oscillator frequency by the factor 720 and the frequency divider FT2 has a divider factor of 3. Thus, step pulses having a frequency of 1,600 Hz. appear at the output of A2, and at output A4 the bit pulses appear with a frequency of 4,800 Hz.

In the case of the octavalent phase-difference modulation, three specified bits are assigned to each phase shift value, so that eight different combinations are obtained. If the correcting signal occurs before the timing pulse at output A2, then an additional pulse is inserted into the frequency divider FT1, so that the duration of a polarity of the output signal and, therewith, the timing pulse, is shortened. If the correcting signal occurs after the timing pulse, then a pulse in the frequency divider FT1 is suppressed over the correcting circuit KT, so that there is no switching of a bistable stage lengthening the duration of the timing pulse.

The reference carrier wave is synchronized concurrently with the clock synchronization. During this process, in the correcting circuit KR, $n$ times the reference carrier wave ($8 \times \phi_r$) is compared with the frequency-converted receiving signal. The comparison is in each case released by the corrected timing pulse. In doing so, the phase position of $n$ times the reference carrier ($8 \times \phi_r$) is compared with the phase position of the received carrier signal and, if there is a difference, a phase correction is initiated by inserting or suppressing a pulse in the frequency divider FT3. At the same time, however, a pulse is also inserted or suppressed in the frequency divider FT5. The frequency divider FT5 has a division factor of 120, so that at the output thereof a frequency of 28.8 kHz is generated. This output is delivered as a conversion frequency to the frequency converter FU, which converts the received carrier wave into the frequency of 27 kHz. A greater frequency error of the received signal is equalized by the additional carrier phase correction over the frequency divider FT5.

Figure 2:
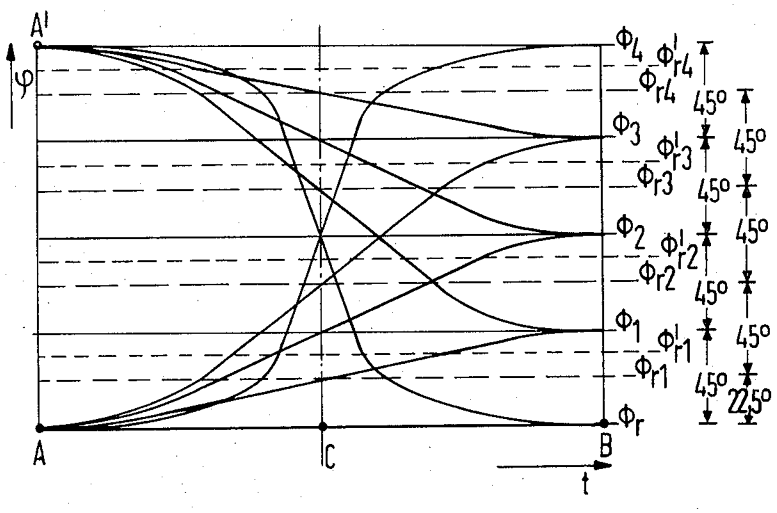
FIGS. 2 and 3 are time diagrams illustrating the deviation of the correction signals for the clock synchronization.
Figure 3:
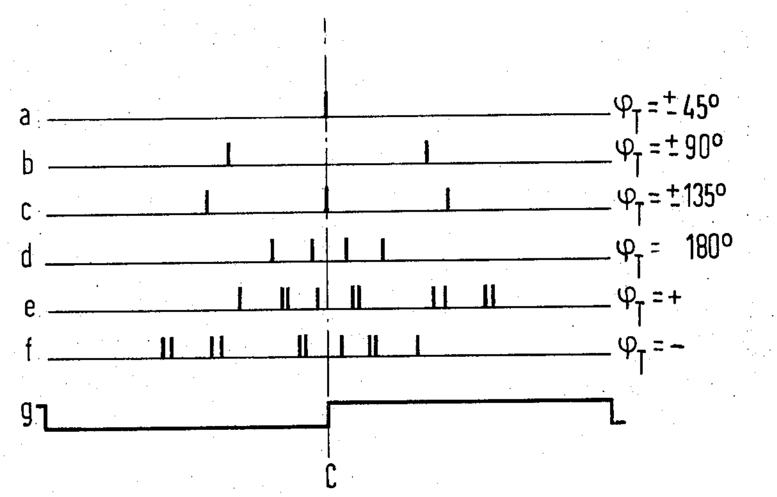

The time diagram of FIGS. 2 and 3 illustrates the derivation of the correcting signals. The carrier wave of the received data signal advances or lags in phase during a modulation period of the reference carrier wave, depending on the sign and magnitude of the phase shifts. FIG. 2 shows the different possible phase changes of the data signal with respect to the reference carrier during a modulation period between the scanning instants A and B. Proceeding from point A, positive phase transitions, and from point A' negative phase transitions at instants $\phi_1$ to $\phi_4$ are plotted in accordance with the phase transitions $\phi T$ modulated on the receiving end. In FIG. 2 are plotted, in a vertical direction, the phase changes of the modulated signal with respect to the unmodulated signal. The phase of the data signal wave and the phase of the unmodulated reference carrier wave are compared with each other at time intervals corresponding to a carrier wave period.

A correcting signal for the pulses is formed whenever the phases of the two waves have shifted by 45° since the last preceding correcting pulse. The position of the 45° thresholds is determined at the start of the transmission by the random initial value of the carrier phase. Thus, the correcting signals are formed in the phase-comparison circuit PV by continuous comparison of the received data signal with the four reference phases $\phi_{r1}$, $\phi_{r2}$, $\phi_{r3}$ and $\phi_{r4}$, which are shifted by 22.5°, 67.5°, 112.5° and 157.5°, respectively, relative to the reference phase $\phi_r$. The lines *a* to *d* in FIG. 3 show symbolically, by pulses, the correcting signals arising at the intersection points of the data signal carrier with the shifted reference phases $\phi_{r1}$ to $\phi_{r4}$. The "center of gravity" of these pulses characterizes the instant *C* of the start of the step (line g in FIG. 3).

At the beginning of the transmission, there is still no synchronism with respect to the reference phase $\phi_r$, so that the reference phases $\phi_{r1}$ to $\phi_{r4}$ are shifted in the manner indicated in FIG. 2 by the reference phases $\phi'_{r1}$ to $\phi'_{r4}$. To lines *a* to *d*, in FIG. 3, are assigned the phase shifts $\phi T$ that occur so that in each case a correcting signal is generated only when the difference of the phase changes since the preceding correcting signals which have arisen through the positive phase shifts $\phi T$, and line f illustrates the signal generated through the negative phase shifts $\phi T$.

The clock synchronizing circuit ST operates to average out the correcting signals, which results in the step C. In this connection, approximately the same number of positive and negative phase shifts $\phi T$ must be contained in the receiving signal. This is, for example, achieved by the transfer of a random text, which is accomplished by means of a scrambler in the transmitter and a descrambler on the receiver. The scrambler achieves a code independence relative to the message to be transferred, by virtue of the fact that the message is translated into a bit sequence having a quasi-random-like character using a 9-stage regenerated shifting register. Independent of the carrier phase, there are always approximately the same number of correcting signals before and after the centers of the phase transitions, i.e., before and after the interval between two scanning cycle instants. Each correcting signal advances or resets the timing phase by a small amount. The clock synchronization is independent of the carrier phase. Therefore, it is not necessary that the reference carrier phase always be synchronized.

Figure 4:
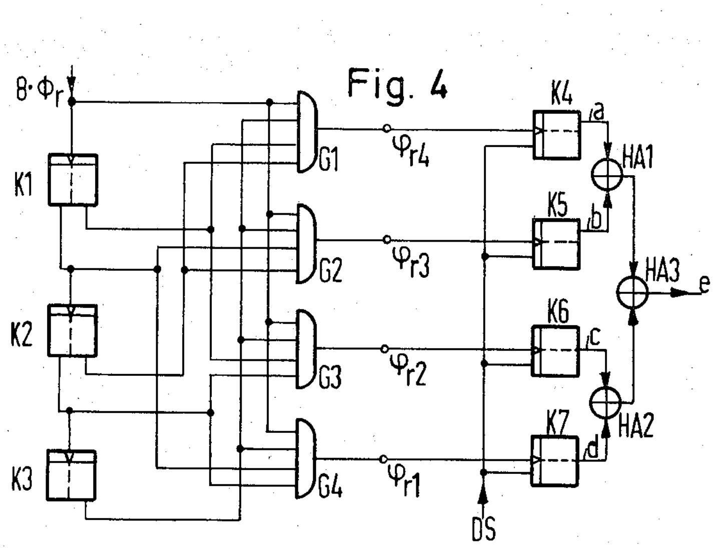
FIG. 4 is a schematic diagram of a preferred embodiment of a phase-comparison circuit used in the invention.
Figure 5:
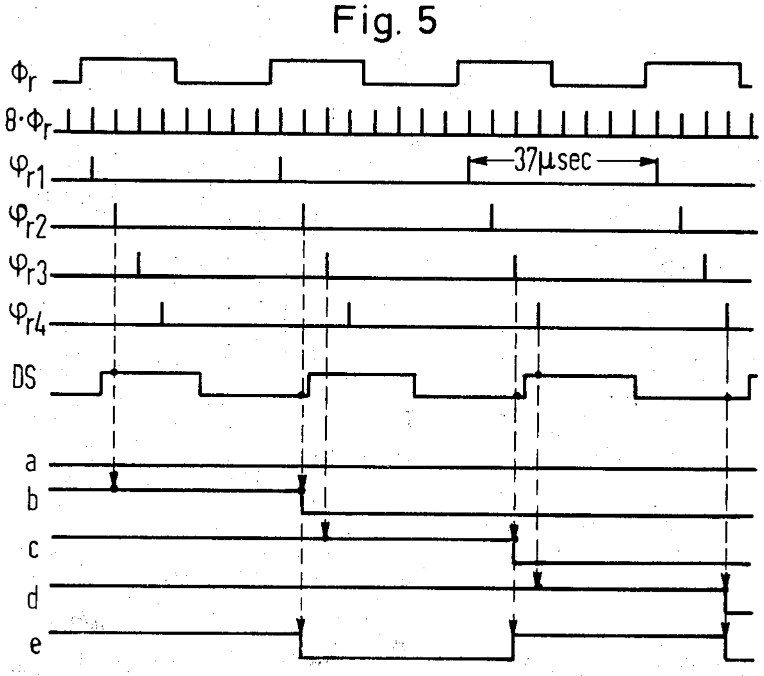
FIG. 5 is a time diagram for the phase-comparison circuit of FIG. 4.

FIG. 4 shows an exemplary embodiment of the phase comparator (PV in FIG. 1). The corresponding time diagram is shown in FIG. 5, in which the lines are provided with reference symbols which are plotted in FIG. 4 at the locations of the circuit at which the pulse trains shown occur.

A signal having a frequency of *N* times the reference carrier (FT3 in FIG. 1) is routed to the phase comparator from the carrier synchronizing circuit. This example uses a frequency of eight times the carrier frequency ($8 \times \phi_r$), which in the second line of FIG. 5 is only shown with the positive edges. The first line shows the reference carrier wave $\phi_r$ with a cycle duration of 37 usec, which corresponds to a frequency of 27 kHz. With the aid of switching stages K1, K2 and K3, which are connected as the eighth divider, the reference carrier wave is divided into eight phase regions of 45° each. At the outputs of the AND gates, G1, G2, G3 and G4, disposed thereafter, are generated the scanning pulses $\phi_{r1}$, $\phi_{r2}$, $\phi_{r3}$ and $\phi_{r4}$ with the phase shifts by 22.5°, 67.5°, 112.5° and 157.5° relative to the reference wave. Thus, the pulses occur at the instants of the reference phases $\phi_{r1}$ , $\phi_{r2}$, $\phi_{r3}$ and $\phi_{r4}$ of FIG. 4.

The interval between two pulses of adjacent lines corresponds to a phase region of 45° of the reference carrier wave. The reference carrier $\phi_r$ is scanned with these pulses at intervals corresponding to the cycle duration thereof of 37 usec each. The clipped data signal carrier DS appears at the triggering inputs of switching stages K4, K5, K6 and K7 and is coupled into the switching stages by the scanning pulses $\phi_{r1}$ to $\phi_{r4}$. With each phase change between the reference carrier wave and the data signal carrier of 45° occurring since the last switching of one of the switching stages K4 to K7, one of the switching stages again changes state. The changes of the signal states at the outputs of switching stages K4 to K7 (FIG. 5, lines *a* to *d*) indicate that the phase of the data signal is equal to one of the reference phases $\phi_{r1}$ to $\phi_{r4}$ (FIG. 2), thus, characterizing the pulses shown symbolically in FIG. 2, lines *a* to *f*. The outputs of the switching stages are combined using conventional half adders HA1, HA2, and HA3, which can be constructed as exclusive OR gates and cause an addition module 2 without transfer. A change of the signal state (line *e* in FIG. 5) takes place at the output of the half adder HA3, when one of the switching stages K4 to K7 changes its state.

Figure 6:
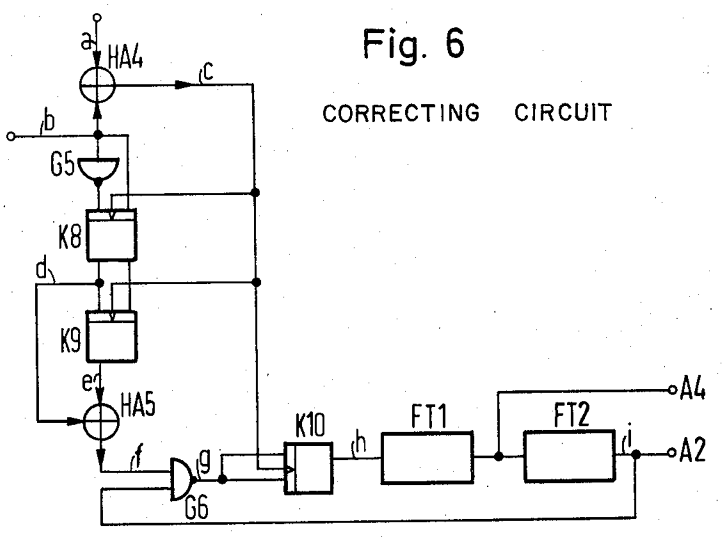
FIG. 6 is a schematic diagram of a preferred embodiment of the correcting circuit for the clock synchronization used in the invention and FIG. 7 is a time diagram for the correcting circuit of FIG. 6.
Figure 7:
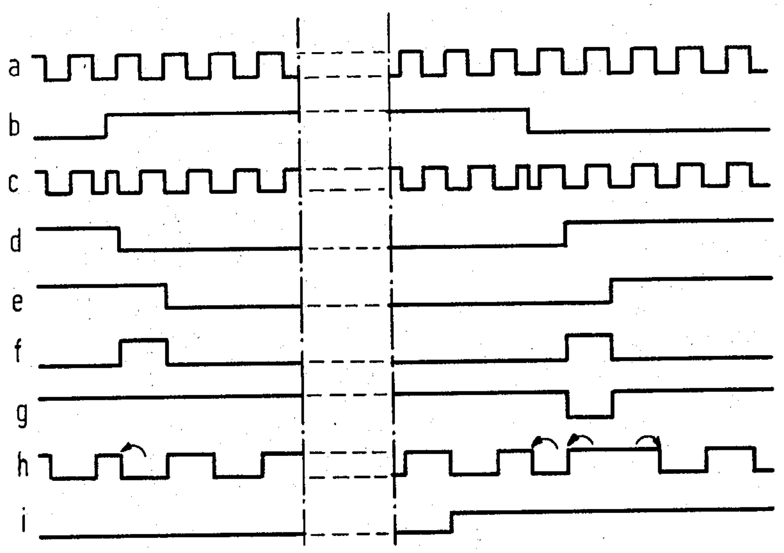

FIG. 6 shows the correcting circuit for the clock synchronization (KT in FIG. 1) and FIG. 7 illustrates the corresponding time diagram for this element. The lines in FIG. 7 are provided with reference symbols which have been plotted in the circuit of FIG. 6 at the locations where the corresponding pulse trains occur.

At the input of half adder HA4 (FIG. 6) appears the square output signal of the oscillator (RG in FIG. 1) having a frequency of 3.456 MHz (line *a* in FIG. 7). At the other input of half adder HA4 is connected the output of half adder HA3 (FIG. 4). The pulse signal transmitted by the phase comparator is shown by line *b* in FIG. 7. Each change occurring in the output signal of the phase comparator characterizes a passage of the data signal at the threshold values of, respectively, 22.5°, 67.5°, 112.5° or 157.5° and triggers a correction of the synchronizing phase. Always, the correction takes place by the same amount which, in this case, is 0.14 usec. If the phase change is $k \times 45°$ (k . . . 0, 1, 2, 3, 4), then the phase comparator supplies *k* changes of the signal states. The more changes reach the correcting circuit, the greater the correction. On an average, $k = 2$. If the change occurs in the region between −50 and 0 percent of the step duration, then the step pulses are accelerated. If the change lies in the region between 0 and +50 percent, then the step pulses are delayed. After synchronization, it is achieved that the beginning of the step (0 percent) coincides with the "center of gravity" of the phase transitions, which corresponding to the point C in FIG. 2, and is held there.

With each change (line *b* in FIG. 7) coming in from the phase comparator, the oscillator voltage across half adder HA4 is reversed. Thus, there arises at the output of half adder HA4 an additional pulse edge (line c in FIG. 7). The output voltage of half adder HA4 appears across the control inputs of the two series connected switching stages K8 and K9. The output voltage of the phase comparator (line $b$) appears directly and over gate G5 across the inputs of switching stage K8. The output voltage of switching stage K8 (line $d$) appears across the inputs of switching stage K9. The output signals of switching stages K8 and K9 (lines $d$ and $e$) are combined over half adder HA5, so that at the output a positive pulse (line $f$) appears, whenever its time duration corresponds to the cycle duration of the oscillator frequency (line $a$) and upon the occurrence of a change in the output signal of the phase comparator.

A NAND gate G6 determines if there must be acceleration or delay. At one input of gate G6 is coupled the output signal of half adder HA5, while at the other input the step pulses are connected (line $i$), which are formed in switching stage K10 and frequency dividers FT1 and FT2. The output voltage of gate G6 is shown by line $g$. As long as gate G6 is blocked, a positive voltage appears across the output, and switching stage K10 operates as a second divider at the output of which appears the square wave having a frequency of 1.728 MHz. A change of the output signal of the phase comparator produces, as a consequence, a non-recurring shortening of the cycle duration by 25 percent at the output of switching stage K10. This results in a shortening of the step pulses by 0.23 percent (compare lines $f$ and $h$ in FIG. 7). Opening the NAND gate G6 results in the suppression of a switching operation of sweep stage K10. This means, following the shortening of the cycle duration by 25 percent, a prolongation of 50 percent, in other words, a prolongation of 25 percent in all (compare lines $f$, $g$, and $h$). This prolongation, likewise, causes a delay of the step pulses by 0.23 percent. If changes between −50 and 0 percent occur, then the correction circuit corrects the step pulses at an accelerated pace, and in the range between 0 and +50 percent it corrects at a slower pace. The magnitude of the correction amounts on an average to 0.46 percent per step upon initiation of the synchronization and in relation to the unit duration of the signal.

The synchronizing circuit SR (FIG. 1) for the reference carrier contains a correcting circuit KR which, like the correcting circuit KT, is constructed for the pulses. In the correcting circuit KR, the phases of $n$ times the reference carrier wave are compared at the outputs of the frequency divider FT3, and the data signal carrier wave is converted in frequency. The comparison is always initiated by a timing pulse. After initiation by the pulses, there follows a comparison at the instant at which the first positive edge occurs in the data signal carrier. If there is a phase difference, then in the same manner as with the clock synchronization, there follows a phase correction of the reference carrier wave in the form of a shortening or lengthening of the during of a signal polarity. The correcting step is, in the present case, 1.4° of the reference carrier wave $\phi_r$ per step. Thus, in the border case at a transfer rate of 1,600 Bd, a frequency distortion of between incoming data signal carrier and uncorrected reference carrier wave $\phi_r$ of 6.25 can be corrected. Higher values can be attained by correspondingly larger correcting steps, which, however, affect the formation of the mean value. To overcome this disadvantage, the frequency divider FT5 (FIG. 1) is added, and this has a divider factor of 120. This divider serves to produce the conversion frequency of 28.8 kHz for the frequency converter FU. The correcting steps generated by the correcting circuit serve here to correct frequency errors. The direction of correction is reversed in comparison with the synchronization of the pulses and the reference carrier, since the reflected side band (28.8 kHz − 1.8 kHz) is employed in the frequency conversion. The correctable frequency distoration $f$, through the frequency error correction during the frequency conversion, amounts to about 6.65 Hz. Thus, the entire synchronizing circuit SR for the reference carrier wave can, in the border case, correct a frequency distortion of about ± 12.9 Hz.

The invention has been described hereinabove through a description of a preferred embodiment, by which the advantages of the invention can be realized. This description is not to be considered as limiting. This preferred embodiment may be modified or changed without departing from the spirit or scope of the invention, as defined by the appended claims.

We claim:

1. In a data communication system wherein binary coded data are transmitted in the form of predetermined phase shifts following each other at intervals corresponding to modulation periods, each particular phase shift corresponding to a binary level for said data, a method for adjusting the phase positions of a reference carrier signal and a clock signal in a receiver for the phase difference modulated signals wherein correction signals for the clock signal and the reference carrier signal are derived from the receive carrier frequency of the data signal, comprising the steps of:

Generating a plurality of sequences of read-out pulses displaced by constant phase values and phase locked with said reference carrier signal, sampling said data signal, by means of said read-out pulses, producing a pulse signal having edges coinciding with those instants when ones of said read-out pulses coincide with ones of said data levels of said data signal, deriving a first correction signal from said edges of said pulse signal and from the values of said clock signal, comparing the phases of said data signal and of said reference carrier signal at instants of time determined by said clock signal, producing from the result of said comparison step a second correction signal and adjusting the phase positions of said clock signal and said reference carrier signal in accordance with the values of said first and said second correction signals.

2. Apparatus for synchronizing a receiver for phase difference modulated data signals in data communication systems wherein binary coded data are transmitted in the form of predetermined phase shifts following each other at intervals corresponding to modulation periods and are assigned to step combinations of the data to be transferred, correction signals for the receiver clock rate and a reference carrier signal being derived directly from the received carrier frequency of the data signal, the apparatus comprising:

means for receiving the data carrier signal, an oscillator for generating a frequency of $n$ times the carrier frequency, where the phase modulation has a number of $n$ possible phase changes, first frequency divider means connected to receive the output of said oscillator, phase comparison means having inputs connected, respectively, to an output of said first frequency divider means and to said receiving means, said phase comparison means having logic circuit means for producing at the same interval *n* digitally coded phase values of the reference carrier wave, said phase comparison means having means for comparing said data signal and for producing an output signal if a predetermined phase threshold is exceeded, first correcting circuit means having an input connected to receive the output from said phase comparison means, second frequency divider means having an input connected to receive the output from said oscillator for generating a clock rate, an output of said second divider means being connected to an input of said first correcting circuit to communicate said clock rate to said first correcting circuit, means in said first correcting circuit for comparing said clock rate and the output signal from said phase comparison circuit for transmitting a pulse to said second frequency divider if the output signal from said phase comparison circuit advances in time relative to the timing pulse, and for, in addition, inserting said pulse in said second frequency divider if the output signal from said phase comparison circuit lags in time relative to said timing pulse, said pulse from said first correcting circuit comparison means, generated upon an advance in time of said phase comparison circuit output signal relative to said timing pulse, operating in said second frequency divider to block a pulse from said oscillator, second correction circuit means having inputs connected, respectively, to an output of said receiving means, to an output of said first frequency divider and to an output of said second frequency divider for comparing the phases of the reference carrier signal and the data carrier signal and for producing an output when there is a difference between the phase positions of the latter two signals and means connecting said correcting signal to said first frequency divider means.

3. The apparatus defined in claim 2 wherein said phase comparison means includes a first plurality of bistable switching stages for dividing by a factor of 8, the output of said first frequency divider means being connected to a control input of said first plurality of bistable switching means, said phase comparison means further comprising at least four AND gates, the inputs thereof being connected to the output of said first frequency divider means, each of said and gates having three additional inputs connected, respectively, with each of the outputs of the individual ones of said first plurality of bistable switching stages, said apparatus further comprising:

a second plurality of bistable switching stages with the outputs of each of said AND gates being connected to a control input of said second plurality of bistable switching stages, the inputs of said second plurality of bistable switching stages being further connected to an output of said receiving means and first half adder means connected to outputs of said second plurality of bistable switching stages for combining same and producing an output signal when each phase threshold value is exceeded.

4. The apparatus defined in claim 2 wherein said first correcting circuit means includes second half adder means having an input connected to an output of said oscillator and another input connected to an output of said phase comparison means, the output of said second half adder means being connected to the control inputs of a third plurality of bistable switching stages, an input of one of said third plurality of bistable switching stages being connected directly with an output of said phase comparison circuit means and another input thereof being connected with second gate means and thereover to the output of said phase comparison means, the outputs of a stage of said third plurality of bistable switching means being connected with inputs of the second one of said third plurality of bistable switching means, the outputs of said first and second stages of said third plurality of bistable switching means being combined over third half adder means, said first correcting circuit further comprising a NAND gate having an input connected to the output of said third half adder means, a fourth bistable switching stage having an input connected to the output of said NAND gate and another input connected to the output of said second frequency divider means.

5. The apparatus defined in claim 2 further comprising third frequency divider means having an input connected to an output of said oscillator, a frequency converter for converting the received data signal in frequency, said frequency converter having an input connected to an output of said third frequency divider, the output of said second correcting circuit being connected to an input of said third frequency divider.

* * * * *